United States Patent
Simon

(10) Patent No.: US 7,773,120 B2
(45) Date of Patent: Aug. 10, 2010

(54) SCAN-ASSISTED MOBILE TELEPHONE

(75) Inventor: Markus Simon, Buckenhof (DE)

(73) Assignee: Palm, Inc., Sunnyvale, CA (US)

( * ) Notice: Subject to any disclaimer, the term of this patent is extended or adjusted under 35 U.S.C. 154(b) by 938 days.

(21) Appl. No.: 10/542,480

(22) PCT Filed: Oct. 30, 2003

(86) PCT No.: PCT/EP03/12096

§ 371 (c)(1),
(2), (4) Date: Feb. 2, 2006

(87) PCT Pub. No.: WO2004/064383

PCT Pub. Date: Jul. 29, 2004

(65) Prior Publication Data

US 2006/0146359 A1    Jul. 6, 2006

(30) Foreign Application Priority Data

Jan. 15, 2003    (EP)    .................. 03000869

(51) Int. Cl.
H04N 9/47 (2006.01)
H04N 5/225 (2006.01)
H04N 5/228 (2006.01)
H04N 5/222 (2006.01)
G03B 17/48 (2006.01)

(52) U.S. Cl. ............... 348/218.1; 348/208.1; 348/333.1; 348/136; 348/376; 396/431

(58) Field of Classification Search ............. 348/333.1, 348/136, 137, 333.03, 376, 208.1; 396/431
See application file for complete search history.

(56) References Cited

U.S. PATENT DOCUMENTS

| 5,578,813 | A | * | 11/1996 | Allen et al. | ............. 250/208.1 |
| 5,663,806 | A | * | 9/1997 | Grise et al. | ............. 358/406 |
| 6,304,313 | B1 | * | 10/2001 | Honma | ............. 355/18 |
| 6,834,965 | B2 | * | 12/2004 | Raskar et al. | ............. 353/94 |
| 6,978,052 | B2 | * | 12/2005 | Beged-Dov et al. | ......... 382/284 |
| 7,001,024 | B2 | * | 2/2006 | Kitaguchi et al. | ............. 353/70 |
| 7,038,716 | B2 | * | 5/2006 | Klein et al. | ............. 348/373 |
| 7,268,803 | B1 | * | 9/2007 | Murata et al. | ............. 348/218.1 |
| 2001/0041073 | A1 | * | 11/2001 | Sorek et al. | ............. 396/431 |

FOREIGN PATENT DOCUMENTS

| DE | 19638882 | | 4/1998 |
| EP | 1168810 | | 1/2002 |
| FR | 2813479 | | 3/2002 |
| JP | 2002-057879 | | 2/2002 |
| JP | 2002-077707 | | 3/2002 |
| JP | 2007053784 | A * | 3/2007 |
| WO | WO 01/58128 | A2 * | 8/2001 |
| WO | 02080099 | | 10/2002 |
| WO | WO 03/091948 | A1 * | 11/2003 |

\* cited by examiner

*Primary Examiner*—John M Villecco
(74) *Attorney, Agent, or Firm*—K&L Gates LLP

(57) ABSTRACT

The present disclosure illustrates an apparatus and method for scanning, in particular documents with the aid of a camera. The method includes combining an image sequence or a sequence of partial images in order to obtain a final image, and projecting a reference model onto the camera vision field and in compensating representational differences of different images on the basis of geometrical information of the model.

5 Claims, 1 Drawing Sheet

SCAN-ASSISTED MOBILE TELEPHONE

FIELD OF TECHNOLOGY

The present disclosure relates to a method for scanning items, such as documents to a mobile telephone.

BACKGROUND

The use of a camera, typically with a low resolution, for scanning documents is known. This involves the camera and/or the mobile telephone being moved over the document at a short distance from it. A final image is generated from the images and/or partial images recorded in this way.

The images are typically recorded using a high scanning frequency of 15 or 30 Hertz. Accordingly, this contributes to adjacent images having an extremely high image overlap. A high resolution final image can be continuously established by adjoining narrow film strips from the respective image center and allowing for the camera displacement.

Small variations in the distance between the camera and the document and a slight tilting of the camera which occurs with a hand-held camera nevertheless result in extremely troublesome changes in size in the document content displayed. The size changes must be adjusted to each other in a first processing step, so that the high resolution final image can be constructed without errors. The determination of the position of the camera sensor with respect to the document, particularly in terms of the distance and tilting, is an important condition for fault compensation. The calculation of the relative position information from successive images is a known approach, which is extremely complex and provides results which are mostly very unstable. In general, tiltings of the camera in relation to the document can only be determined with great difficulty, on the basis of the recorded image information by means of image processing.

BRIEF SUMMARY

Under an exemplary embodiment, an apparatus and method is disclosed for the scanning of documents using a device such as a mobile telephone.

The exemplary embodiment allows for the rapid and robust determination of the relative position of the camera sensor in respect of the document.

Under the embodiment, a reference model is projected onto the visual field of the camera. The evaluation of the geometry of the pattern in the images enables the compensation of the representational differences in the images.

A small reference model is permanently projected onto the same position within the visual field of the camera and is evaluated in the recorded image by means of an image processing algorithm. The position of the sensor in relation to the document is uniquely determined in a three-dimensional space from the geometric information of the reference model projected onto the document surface and the reference model represented in the sensor. The use of a reference model permits the extraction of the necessary geometric information for compensating the representational differences in images to be very robust and rapid using the methods of digital image processing and to be effected independently of the content of the scanned document.

An example of a suitable reference model includes a small reticule, which is permanently projected onto the same position within the visual field of the camera. The position of the sensor in relation to the document is determined in a three dimensional space from the information of the reticule parameter (distance) and the relative length of the reticule axis (tipping in x and y direction).

Advantages of using this configuration include rapidity and robustness in the determination of the relative position of the sensor to the document, and an extremely precise determination of the distance and the tilting of the sensor irrespective of the content of the scanned document. Other advantages may be realized without deviating from the spirit and scope of the present disclosure.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
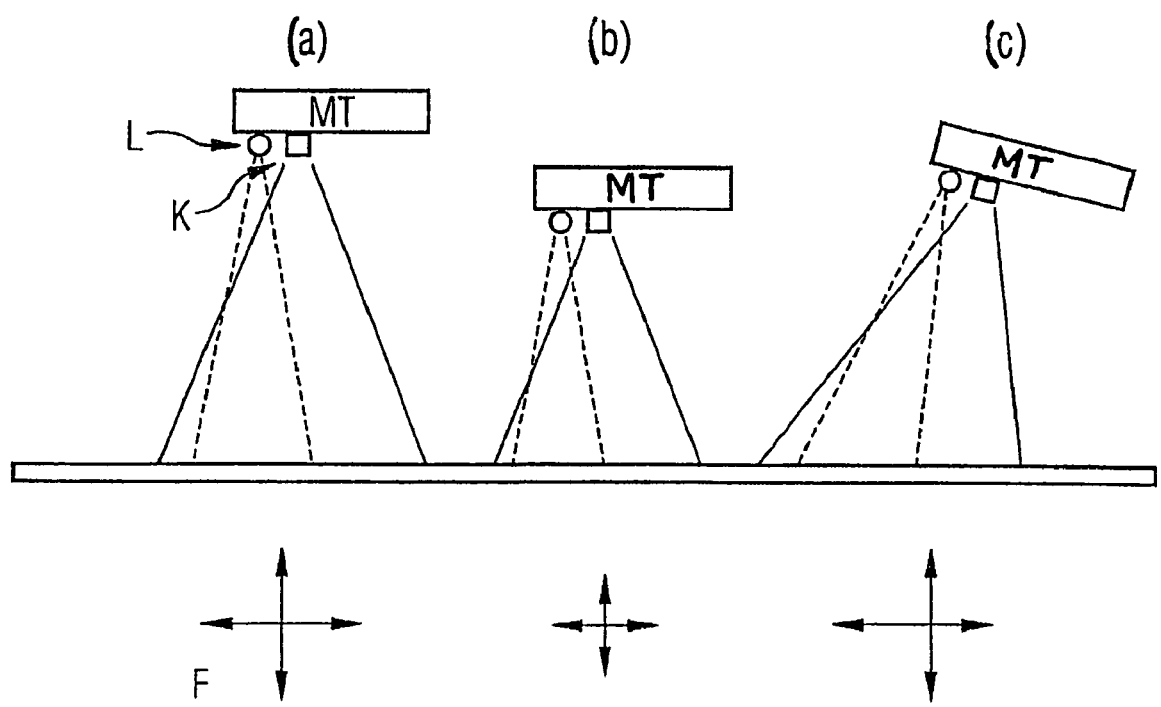
FIG. 1 illustrates a mobile device equipped with a scanning apparatus, arranged in different positions according to an exemplary embodiment.

FIG. 1 illustrates a scanning apparatus and different configurations for determining a position of the apparatus in relation to a document under an exemplary embodiment. While the embodiment is described using a mobile telephone, it is understood that other devices may also be used. FIG. 1 also illustrates a method for the position determination of a camera K in relation to a document (not illustrated in more detail).

Under the exemplary embodiment, camera K is arranged on a mobile telephone MT (collectively referred to as a scanning sensor). Camera K, as illustrated in FIG. 1, is shown on a rear side of mobile telephone MT for recording images from the surroundings. A processor (not show), located either in mobile telephone MT or coupled externally thereto, processes image information and determines a relative position of the relative sensor position. A light-emitting diode (LED) is also included on the rear side of mobile telephone MT, wherein the LED projects a reticule F into the visual field of camera K.

During use, the mobile telephone MT moves across the document at a slight distance in order to scan a document. At substantially the same time, a reference model F is projected towards the document for determining the relative sensor position.

In arrangements a) and b) of FIG. 1, the camera is substantially parallel to the document surface. As can be seen from the FIGURE, the distance of the camera to the document is larger in case a) than in case b). Accordingly, the projected reticule F in the camera image is smaller in case b) than in case a). The reticule size is directly linked to the sensor distance and can be calculated in each instance from the detail screen of the camera.

In arrangement c) of FIG. 1, the camera K and/or the camera sensor is tilted in relation to the master document. The position of the sensor in a 3-dimensional space in relation to the document can be distinctly determined from the absolute size of the reticule in conjunction with the information about the relative length of the reticule axis.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for scanning a document using a mobile device, the method comprising:
   projecting a reference model from a projection device in the mobile device, the reference model having a geometrical configuration into a visual field of the mobile device;
   sensing the reference model via a camera in the mobile device;
   processing the reference model using the geometrical configuration to determine a physical position of the camera in relation to the document, the physical position determined including a distance to the document and a tilt of the camera relative to the document;
   obtaining a plurality of adjacent images using the camera in the mobile device by moving the projection device and the camera together; and
   processing the plurality of adjacent images in accordance with the physical position determined to obtain a final image that compensates for the physical position of the camera when the plurality of adjacent images were obtained.

2. A method of scanning using a mobile device as claimed in claim 1, including moving the mobile device across a document at a distance from the document in order to obtain the plurality of adjacent images.

3. A method of scanning using a mobile device as claimed in claim 2, wherein each of the images in the plurality of adjacent images is a partial image of the final image.

4. A method of scanning using a mobile device as claimed in claim 3, wherein the final image is obtained by adjoining the plurality of adjacent images.

5. A mobile device, comprising:
   a projection device for projecting a reference model having a geometrical configuration into a visual field;
   a camera for obtaining a plurality of adjacent images and for sensing the reference model, wherein the camera and the projection device are each attached to the mobile device so that the camera and the projection device each moves together relative to one another with movement of the mobile device; and
   a processor for (a) processing the reference model using the geometrical configuration to determine a physical position of the camera in relation to a document, the physical position determined including a distance to the document and a tilt of the camera relative to the document; and
   for (b) processing the plurality of adjacent images in accordance with the physical position determined to obtain a final image that compensates for the physical position of the camera when the plurality of adjacent images were obtained.

* * * * *